(No Model.)

T. G. BARLOW-MASSICKS.
AMALGAMATOR.

No. 565,152. Patented Aug. 4, 1896.

Witnesses:
J. Staib
Chas. H. Smith

Inventor:
Thomas G. Barlow-Massicks
per Lemuel W. Serrell
Atty.

UNITED STATES PATENT OFFICE.

THOMAS G. BARLOW-MASSICKS, OF PRESCOTT, ARIZONA TERRITORY.

AMALGAMATOR.

SPECIFICATION forming part of Letters Patent No. 565,152, dated August 4, 1896.

Application filed February 1, 1896. Serial No. 577,652. (No model.)

*To all whom it may concern:*

Be it known that I, THOMAS G. BARLOW-MASSICKS, a subject of the Queen of Great Britain, residing at Prescott, in the county of Yavapai and Territory of Arizona, have invented an Improvement in Amalgamators, of which the following is a specification.

This invention relates especially to the riffle-plates and troughs containing mercury, and with which the gold is amalgamated as it is caught in the riffles or troughs while being carried down over the riffle-plates with the earthy materials by a stream of water.

The special feature of the present invention relates to an inclined plate of iron or steel, having flanges or sides and cross-ribs forming receptacles for holding the mercury, and these plates are provided with lugs and rings for convenience of handling, and they are combined with troughs having substantially flat bottoms and contracted at the upper part, the side of the trough to which the upper end of the riffle-plate is connected being inclined, so as to prevent the rush of water displacing the mercury and carrying the same out of the trough, and the lower end of one riffle-plate is connected with the trough above the upper end of the riffle-plate next below, there being openings for the passage of the water and earthy materials as the direction of flow is changed in passing from a plate inclined in one direction into the trough and upon the surface of the next lower plate inclined in the other direction. By this arrangement and construction the amalgamator is rendered very compact and can be easily taken apart for removing the gold amalgam from the troughs and riffles.

Figure 1:
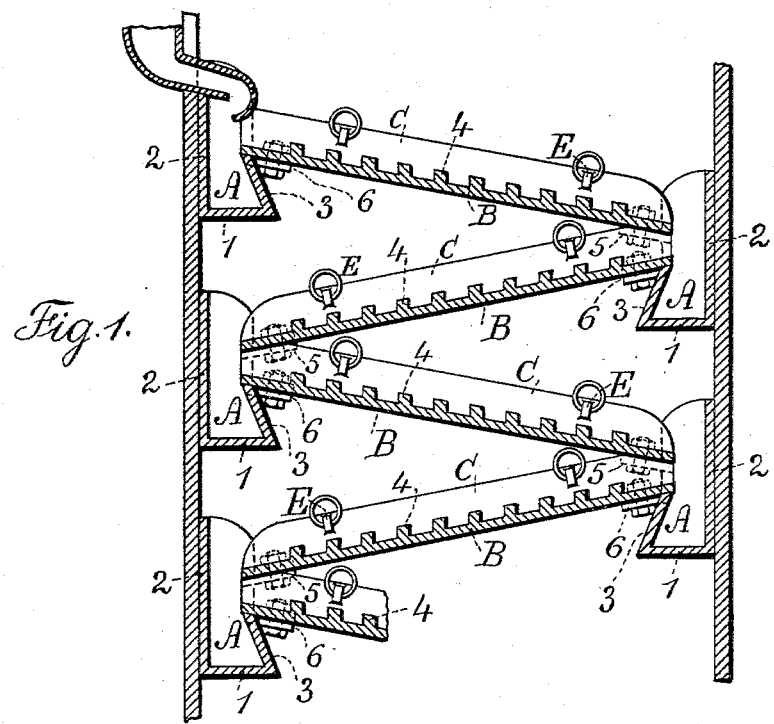
Figure 2:
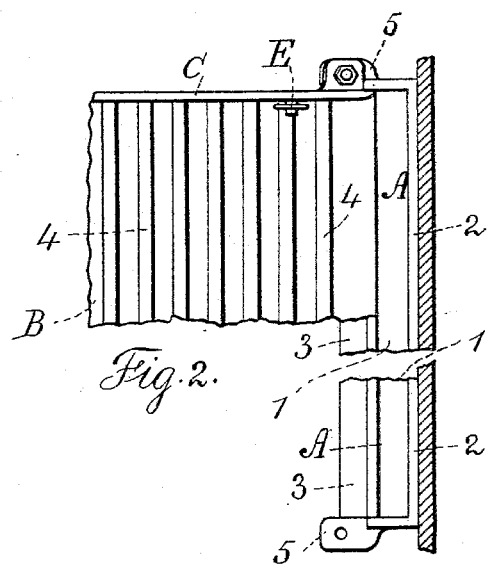

In the drawings, Figure 1 is a vertical section illustrating the present improvement, and Fig. 2 is a plan view at one corner of the trough to illustrate the manner in which the plates and troughs are bolted together.

The troughs A are made with substantially flat bottoms 1 and vertical sides 2 and inclined sides 3, and the ends of the troughs are closed, and in consequence of the side 3 of each trough being inclined, the space between its upper edge and the side 2 of the trough is much less than the width of the bottom, the object being to prevent the quicksilver in the bottom of the trough being washed out by the force of water and earthy material flowing from one riffle-plate into the trough and rising and flowing away upon the next riffle-plate below.

Each riffle-plate is made with side flanges C and a bottom B, and in the surface of the bottom there are ribs or riffles 4, which are preferably flat upon the upper surfaces, and the channels between the ribs are angular and the sides of the ribs or riffles are advantageously at an acute angle to the bottom of the riffle-plate, so that the mercury introduced into the groove or channel will not be washed out by the water flowing down the surface of the riffle-plate, and there are projecting lugs 5 and 6 upon the trough through which lugs bolts pass for connecting the lower end of the upper riffle-plate to the flange 5, and the upper end of the next lower riffle-plate to the flange 6.

By providing any desired number of troughs and riffle-plates, the amalgamator can be constructed by putting these troughs and riffle-plates together so that the riffle-plates are inclined in opposite directions, as shown in the drawings, and they are firmly connected together by the bolts and flanges 5 and 6, and all the riffle-plates are alike and all the troughs are alike, and it is only necessary to provide a suitable framework or support for the respective troughs, and after the amalgamator has been properly charged with the quicksilver and operated in the usual manner by causing the auriferous material in a finely-pulverized condition to flow by the current of water from the top end of the apparatus over the inclines to the bottom end of such apparatus, the gold will be retained and absorbed by the mercury, and whenever it becomes necessary, the parts of the amalgamator are easily separated by removing the bolts through the flanges 5 and 6 and plates and lifting out the respective riffle-plates by the rings or similar devices through the lugs E.

The amalgam can be easily removed from the plates and also from the troughs, and the apparatus can be set together and put in operation as before.

The riffles 4 may either be separate or integral with the plates B and of any suitable material.

The flanged edges of the riffle-plates coming within the ends of the trough and the fastening flanges extending outside such ends allow the parts to be connected or disconnected with facility. The bottom of the upper riffle is supported on the flanges of the lower riffle with an intervening space for the water, and the eyes and rings give convenience in handling.

I claim as my invention—

The combination in an amalgamator of similar riffle-plates and similar troughs, each riffle-plate having riffles on its upper surface, and edge flanges and flanges at its outer edges for bolts, and each trough having a flat bottom, a vertical side and an inwardly-inclined side to come below the upper end of a riffle-plate, ends to the trough and outwardly-projecting flanges for the attaching-bolts, the parts being constructed so that the upper end of the lower riffle-plate is connected directly to the edge of the trough and the lower end of the riffle-plate is supported directly above with an intermediate space for the flow of the water, substantially as specified.

Signed by me this 14th day of December, 1895.

THOS. G. BARLOW-MASSICKS.

Witnesses:
C. E. GUNNISON,
T. W. JOHNSTON.